Feb. 6, 1962 R. J. HARKENRIDER 3,020,103
JOURNAL BOX LUBRICATOR

Filed Nov. 16, 1959 7 Sheets-Sheet 1

Inventor.
Robert J. Harkenrider
By:- Mann, Brown & McWilliams
Attys.

Feb. 6, 1962 R. J. HARKENRIDER 3,020,103
JOURNAL BOX LUBRICATOR
Filed Nov. 16, 1959 7 Sheets-Sheet 2
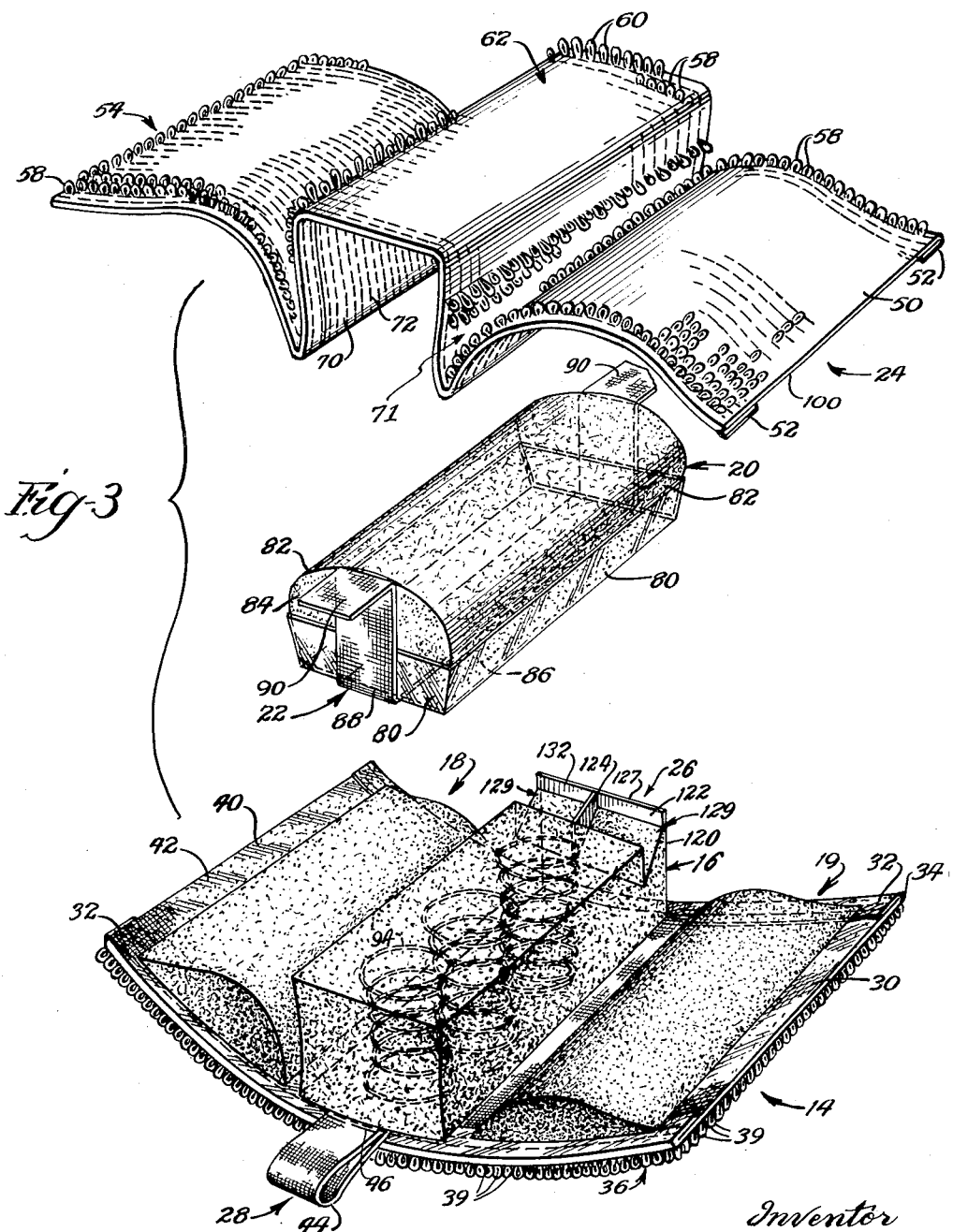
Inventor
Robert J. Harkenrider
By:-
Mann, Brown & McWilliams
Attys.

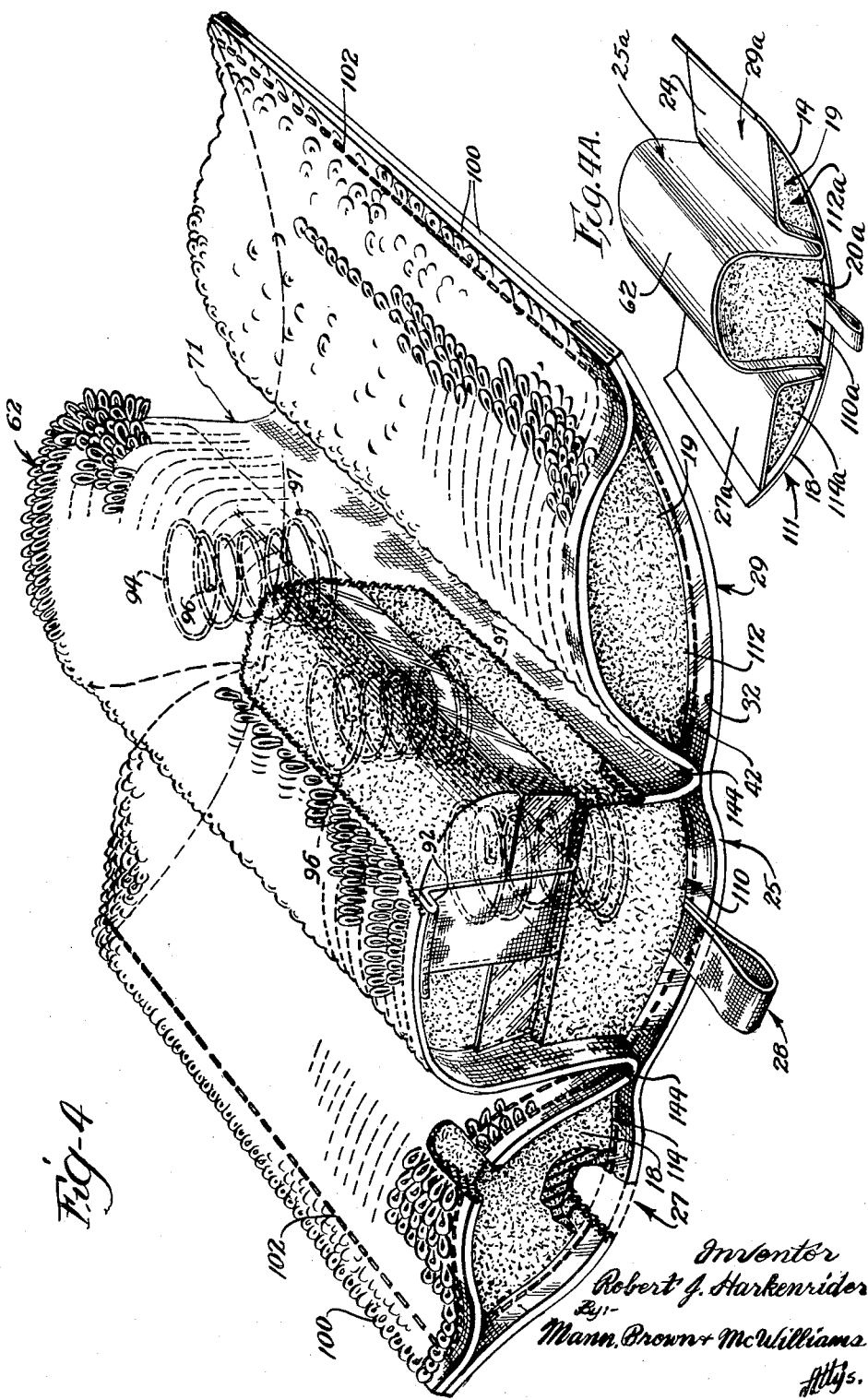

Feb. 6, 1962 R. J. HARKENRIDER 3,020,103
JOURNAL BOX LUBRICATOR
Filed Nov. 16, 1959 7 Sheets-Sheet 4
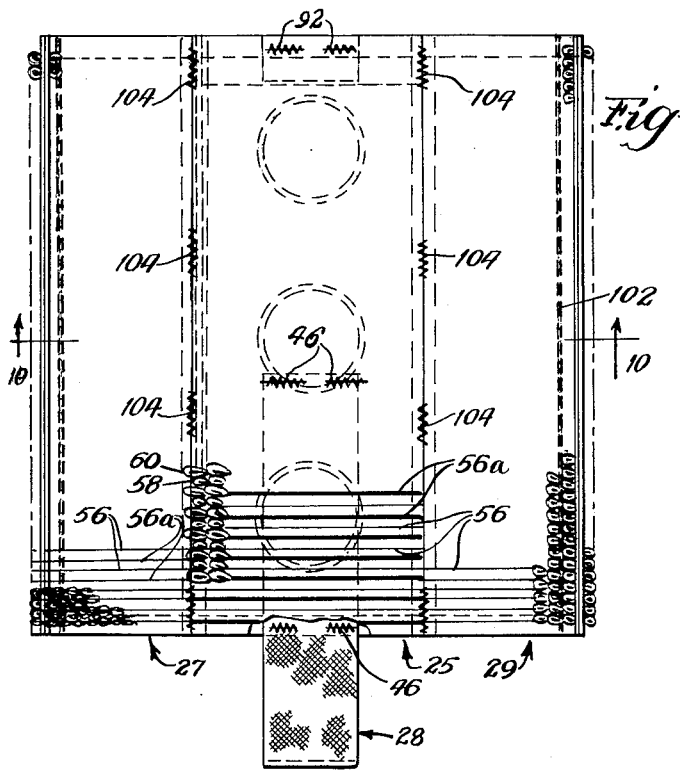
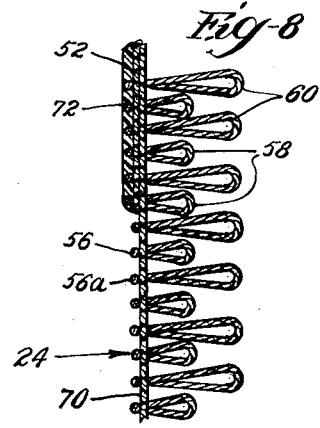
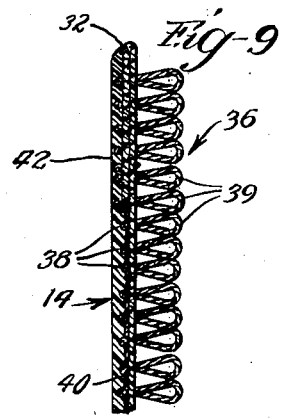
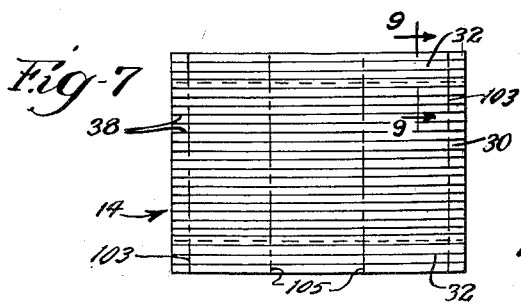
Inventor
Robert J. Harkenrider
By:- Mann, Brown & McWilliams
Attys.

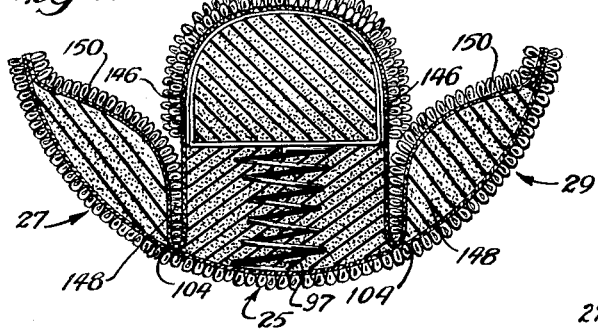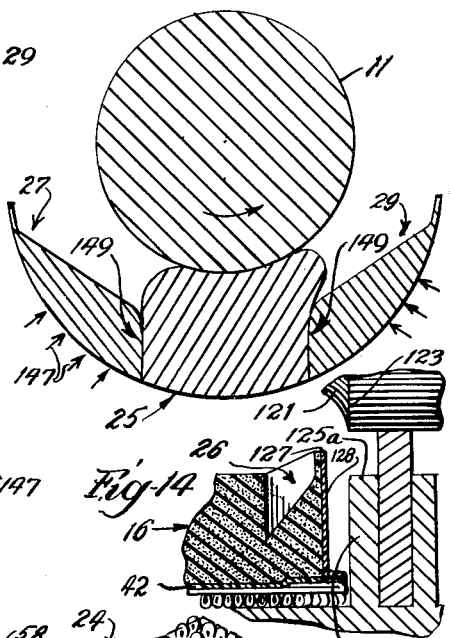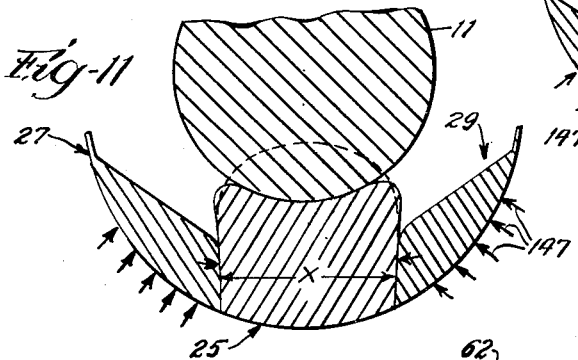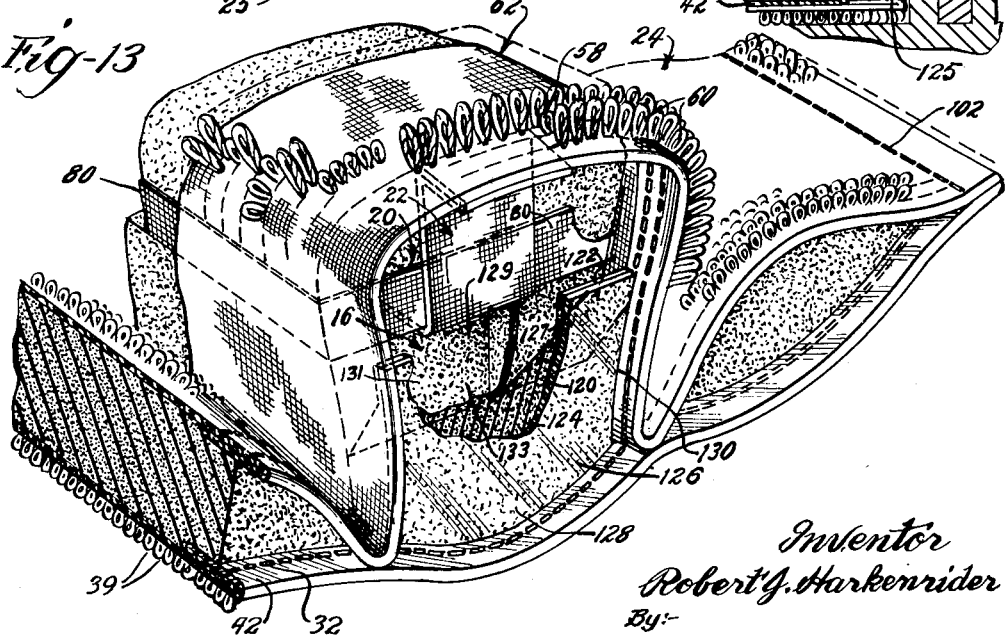

Feb. 6, 1962 R. J. HARKENRIDER 3,020,103
JOURNAL BOX LUBRICATOR
Filed Nov. 16, 1959 7 Sheets-Sheet 6
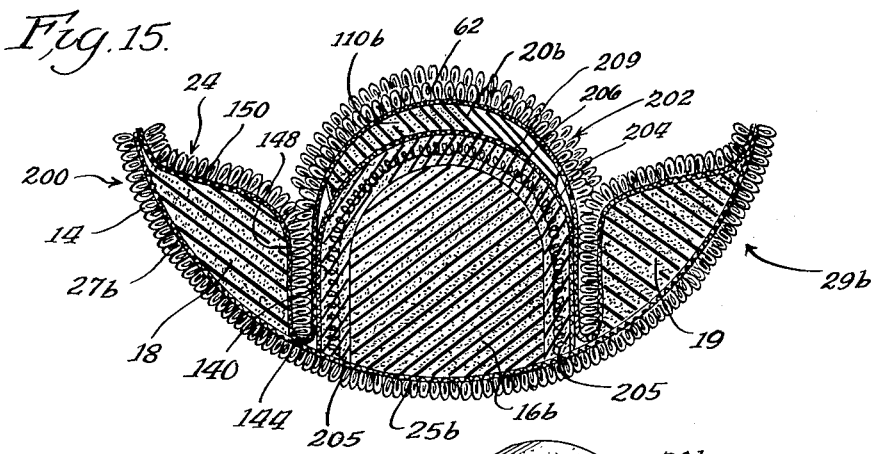
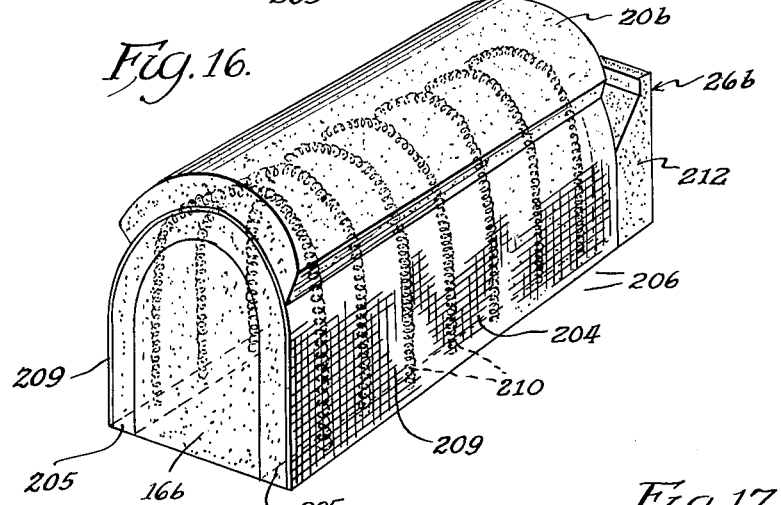
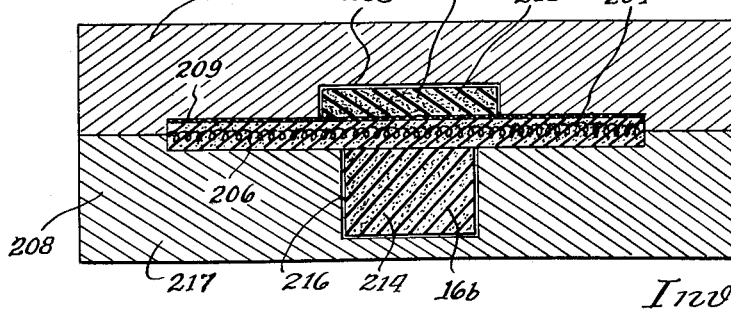
Inventor
Robert J. Harkenrider
By
Mann, Brown & McWilliams.
Attys.

Feb. 6, 1962   R. J. HARKENRIDER   3,020,103
JOURNAL BOX LUBRICATOR
Filed Nov. 16, 1959   7 Sheets-Sheet 7
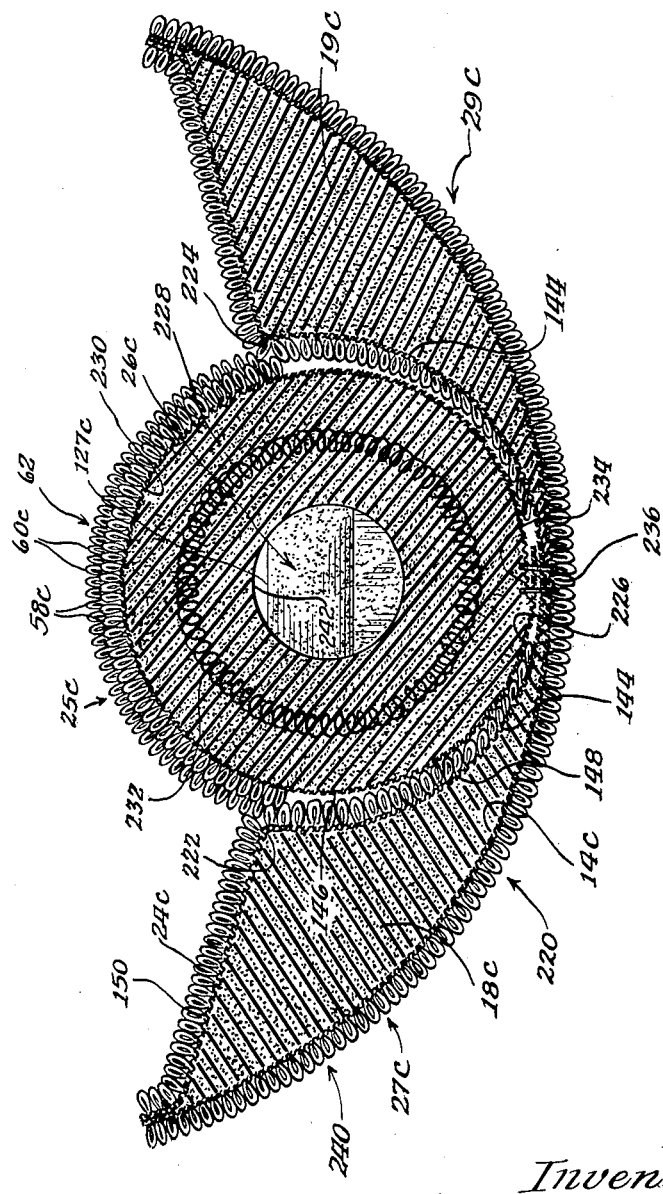
Inventor
Robert J. Harkenrider
By Mann, Brown & McWilliams
Attys United States Patent Office 3,020,103
Patented Feb. 6, 1962

3,020,103
JOURNAL BOX LUBRICATOR
Robert J. Harkenrider, Winona, Minn., assignor to Miller Lubricator Company, Winona, Minn., a corporation of Minnesota
Filed Nov. 16, 1959, Ser. No. 853,218
18 Claims. (Cl. 308—88)

My invention relates to a lubricator for railroad car journal boxes, and more particularly, to a lubricator for use in such boxes for lifting oil by capillary action from the box reservoir to the journal.

Lubricators for railroad car journal boxes conventionally take the form of a packing package which is applied between the undersurface of the journal and the floor of the journal box in what is commonly referred to as the oil celler of the box.

These lubricators are generally preferred over the old-fashioned waste packing practices, but experience has shown that they have a number of objectionable features that must be eliminated before they realize general acceptance in the railroad industry and achieve the maximum benefits of which the are capable of rendering.

One of the principal objections has been that the lubricator itself is a factor contributing to journal overheating because of the friction between the journal surface and the packing caused by two practices which heretofore were thought necessary to achieve proper lubrication. For instance, since the lubricator must be maintained in contact with the journal under all of the various adverse conditions of operation and yet must accommodate vertical movement of the journal, the customary approach to the problem has been to employ springs or other resilient materials that press the packing against the journal with a maximum force.

Furthermore, most lubricator packing designs take the approach that as much of the journal surface as possible should be contacted to insure the maintenance of an adequate film of oil on the journal. As friction is a function of contact area and pressure, and the large journal surface contacted necessarily requires long capillary feed paths with consequent reduced total oil transfer to the journal, the result is that the very device that is supposed to keep the journal temperature moderate actually is a contributing factor in journal overheating.

A principal object of my invention is to provide a journal box lubricator of the packing type which not only substantially reduces the journal surface contact area but also engages against the journal surface more uniformly and with materially reduced pressures, as compared to conventional packings.

A further principal object of the invention is to provide a lubricator packing that maintains contact with the journal, as well as its shape, under all of the various adverse conditions of operation.

Still further objects of the invention are to provide a lubricator of the packing type which quickly absorbs oil when the latter is added to the box, to provide a packing package which prevents oil leakage from the rear of the box, to provide a lubricator having a capillary feed path of minimum length on both sides of the journal, and to provide a journal box packing which is inexpensive of manufacture, which is convenient to install and reclaim, and which is adapted for use in all conventional railroad car journal box structures.

Other objects, uses and advantages will be obvious or become apparent from a consideration of the following detailed description and the application drawings.

In the drawings:
FIGURE 1 is a transverse cross-sectional view through familiar parts of a railroad car journal and journal box, showing the same equipped with the lubricator of the present invention, parts of the lubricator being shown in section;

FIGURE 3 is a diagrammatic exploded perspective view illustrating the various components of a preferred form of the present invention;

FIGURE 4 is a diagrammatic perspective view of a preferred form of the invention in assembled relation, parts being broken away for clarity of illustration;

FIGURE 4A is a diagrammatic perspective view of a modified form of the invention;

FIGURE 5 is a top plan view of the improved lubricator of FIGURES 1-4;

FIGURE 6 is a diagrammatic plan view of the lubricator's upper capillary blanket shown, for instance, in FIGURE 3, diagrammatically illustrating the manner in which the pile forming strands are incorporated in the blanket material;

FIGURE 7 is a view similar to that of FIGURE 6 but illustrating the lower sheet of capillary material of the lubricator;

Figure 2:
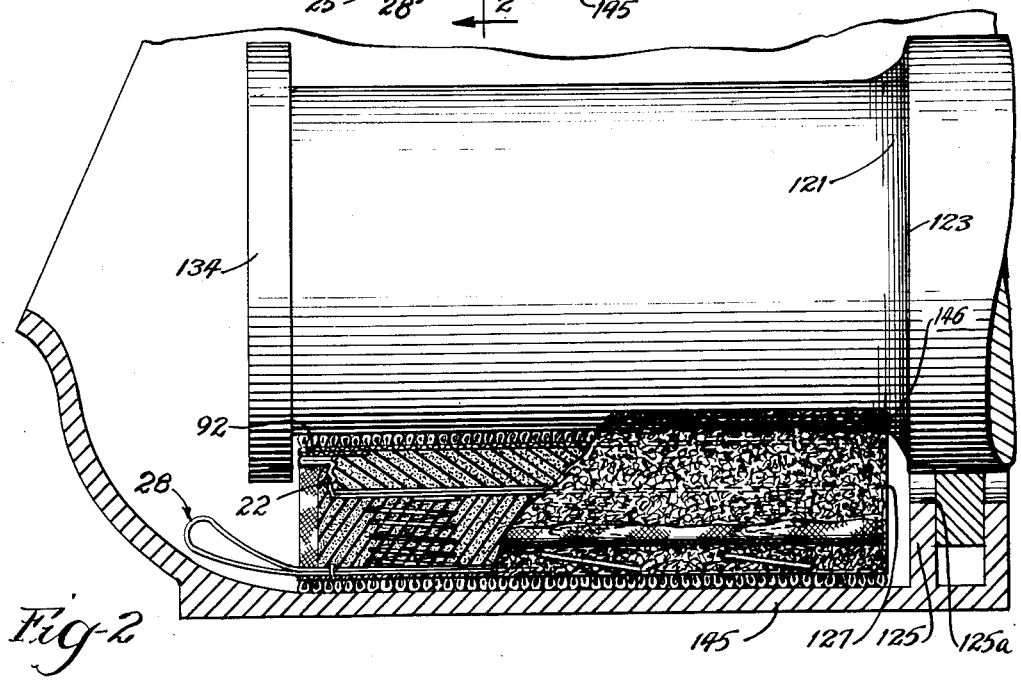
FIGURE 2 is a longitudinal cross-sectional view through the journal box and lubricator packing package illustrated in FIGURE 1 approximately along line 2—2 of FIGURE 1, the journal and parts of the lubricator being shown in elevation.

FIGURES 8 and 9 are diagrammatic cross-sectional views along lines 8—8 and 9—9, respectively, of FIGURES 6 and 7;

FIGURE 10 is a cross-sectional view of the lubricator along line 10—10 of FIGURE 5;

FIGURE 11 is a diagrammatic view illustrating the lubricator applied to a stationary journal and bringing out important relationships between the lubricator lobes and the journal;

FIGURE 12 is a view similar to that of FIGURE 11, but showing the structural relationships involved when the journal rotates;

FIGURE 13 is a fragmental perspective view of the rear end of the lubricator as viewed in FIGURES 2 and 4, illustrating the oil dam forming a part of my invention (parts being broken away);

FIGURE 14 is a fragmental longitudinal sectional view through the center lobe of the lubricator and the box at the rear end of the box illustrating the relationship between the lubricator oil dam, the rear of the box, and the journal;

FIGURE 15 is a view similar to that of FIGURE 10, but illustrating a further modified form of the invention;

FIGURE 16 is a diagrammatic perspective view of the core structure forming part of the center lobe of the lubricator of FIGURE 15;

FIGURE 17 is a diagrammatic sectional view through an appropriate mold that may be employed in the manufacture of the core structure of FIGURE 16, showing the core structure in the process of being assembled; and FIGURE 18 is a view similar to that of FIGURE 10, but illustrating yet another embodiment of the invention.

*General description*

Figure 1:
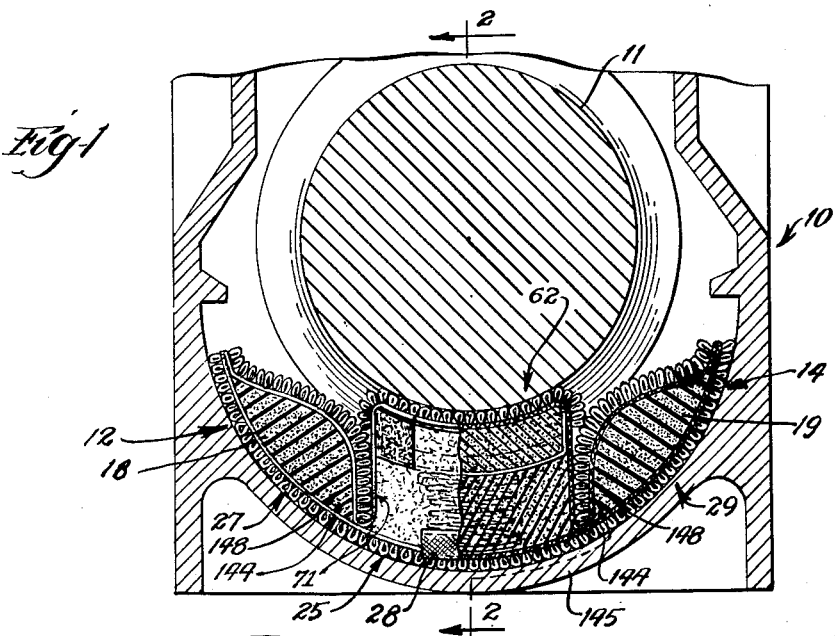

Referring now more particularly to FIGURES 1 and 2 of the drawings, reference numeral 10 generally indicates a conventional journal box on a conventional axle journal 11 having a lubricator packing package according to my invention, generally indicated by reference numeral 12, placed between the lower portion of the journal and the bottom of the journal box in the oil celler of the journal box.

The package 12 forming the embodiment of the invention shown in FIGURES 1 and 2, generally comprises (see FIGURE 3) a lower capillary sheet 14 on which are mounted a relatively stiff or firm center foam body 16 and relatively stiff or firm side foam bodies 18 and 19, a soft and pliable foam body 20 that is received on top of the foam body 16, a strap 22 secured about the soft body 20, and an upper capillary sheet 24 that is secured to the lower sheet 14 about the bodies 16, 18, 19 and 20. An oil dam 26 is associated with the foam body 16 and the upper capillary sheet 14 in the illustrated embodiments of the invention, and a handle 28 is secured to the lower sheet 14 for use in withdrawing the lubricator from the journal.

Referring to FIGURES 1, 4 and 10, it will be seen that the lubricator 12 thus takes the form of a center lobe 25 that is proportioned to engage the journal and two side lobes 27 and 29 which do not contact the journal, but, in accordance with my invention, serve to hold the center lobe in operative position. The relatively soft upper portion of center lobe 25 not only engages a reduced portion of the journal surface, but also bears against the journal surface with greatly reduced pressures, thus minimizing friction between the lubricator and the journal.

FIGURE 4A illustrates a modified form of the invention wherein a single relatively soft foam body 20a replace bodies 16 and 20, while FIGURES 15–17 illustrate a further modified core structure for the center lobe. FIGURE 18 illustrates yet another modified form of the invention.

The capillary blankets

The structural features of blankets 14 and 24 are best brought out in FIGURES 3 and 6–9 (while these blankets are separately described, in practice they can be made from the same fabric materials). Blanket 14 comprises a woven fabric sheet 30 of any suitable material, such as cotton duck canvas or chafer cloth having two of its opposed edges 32 doubled over as at 34 and stitched in place to direct loose fiber ends inwardly of the lubricator. The fabric 30 is provided with a piled surface 36 formed by a plurality of continuous parallel strands 38 of high capillary action material in which the strands 38 are oriented to extend transversely of the journal when the lubricator has been applied to the journal box. The individual strands are formed into pile loops 39 that define the pile surface or tufting 36 and because of the orientation of the strands 38, the loops 39 are arranged in rows that extend transversely of the journal. The inwardly facing surface 40 of the sheet 30 may be entirely coated with an adhesive 42 (see FIGURES 4, 9 and 13) to make the capillary sheet 30 oil impermeable, and to reinforce it.

The chafer cloth used to form sheet 30 in a specific embodiment of the invention is canvassing weighing 14.4 oz. per square yard, 8/4 ply in a 23 x 23 count, such as made by Willingham Cotton Mills of Macon, Georgia. Strands 38 are preferably formed from materials such as long staple cotton fibers, which give strands 38 a greater capillary lift action than the sheet 30 itself will have. Fine wool fibers and nylon are also suitable for forming strands 38.

The adhesive 42 may comprise any appropriate material, many of which are known as rubber base cements. Many of the so-called synthetic rubbers are appropriate, for instance, Hycar latex No. 1552, Type OR–25, made from petroleum by B. F. Goodrich Chemical Co., of Akron, Ohio, and thickened with a 12% ammonium casein solution.

Handle 28 in the illustrated embodiment of the invention takes the form of pull out strap 44 formed from cotton tape or the like and secured at its ends, as by appropriate stitching 46, to capillary sheet 14.

Capillary sheet 24 generally comprises a sheet of a suitable woven fabric 50, which may take the form of one of the materials specified above for sheet 30, having its edges 52 doubled over and stitched to the sheet so that loose ends will be directed inwardly of the lubricator. The woven material may be any suitable fabric such as a suitable grade of canvas.

The capillary sheet 24 is provided with a piled surface 54, which as indicated in FIGURE 6, is formed by continuous pile forming strands 56 and 56a (having high capillary lift characteristics which are preferably equivalent to or better than strands 38, as compared to the normal capillary characteristics of sheet 50) that are oriented to extend transversely of the journal when the lubricator is applied in operative position in the box. The strands 56 and 56a form individual loops 58 and 60 which are arranged in parallel rows that extend transversely of the journal. Loops 58 are relatively low loops while loops 60 are relatively high loops. The relatively high loops 60 are applied only across the portion of capillary sheet 24 that contacts the journal, which is the applicator surface indicated by reference numeral 62 in FIGURE 1 and which is thus provided with the multi-level tufting described in my copending application Serial No. 720,230, filed March 10, 1958, now Patent No. 2,991,135, granted July 4, 1961. In a tested embodiment of the invention conforming to the principles herein disclosed, loops 58 when extended (as shown in FIGURES 8 and 9) are on the order of ⅜ inch long while loops 60 when extended are on the order of ¾ inch long (loops 39 of lower sheet 14 have substantially the same length of loops 58).

It will be observed that strands 56a, which are alternated between strands 56 and form the high pile loops 60, also form low pile loops 58 where the strands 56a extend away from the applicator surface 62. In FIGURES 5 and 6, the darkened portions of the strands 56a indicate the area of the capillary sheet 24 in which they form high loops.

The multi-level pile or tufting of applicator surface 62 insures adequate oil feed after the loops of the high pile level have been severed after extended periods of use.

Preferably, neither strands 56 or 56a form loops where indicated at 71 between the applicator surface 62 and stitch line 105 (see FIGURES 1 and 6) to keep the capillary feed paths to surface 62 of minimum lengths. This also reduces the bulk between the center and side lobes.

The undersurface 70 of capillary sheet 24, along doubled over edges 52, may be coated with an adhesive 72 that is similar in nature to adhesive 42 and provides similar results along edges 52.

Adhesive layers 42 and 72 are supplementary features which may be eliminated if so desired.

The resilient bodies

The bodies 16, 18 and 19 of FIGURES 1–14 are all formed from a foam material that is preferably foamed in place on the capillary sheet 14. The foam material is preferably of the open cell type, such as polyester foams, polyether foams, and castor oil foams; these substances fall into the category of the so-called urethane or polyurethane foams made by, for instance, Mobay Chemical Company of St. Louis. Oil resistance latex foams, such as Hycar foam rubber 1552 made by B. F. Goodrich Co. of Akron, Ohio, or vinyl foams will also serve the purpose.

The basic ingredients of, for instance, polyurethane foams, which are preferred, are diisocyanates and polyols. These substances are chain extended by reacting with a small amount of water. During the series of reactions involved, carbon dioxide gas is liberated. As is well known in the art, if the original viscosity of the polyol is favorable, and if the chain extension increases the viscosity at an appropriate rate, this carbon dioxide gas is trapped in the gel structure just as it is in the rising batter of a cake, whereby a multitude of open cells is formed throughout the mixture. If suitable catalysts have been employed, the resulting foam cures to a solid state. An appropriate recipe for one type of foam material would be 70 to 75 parts of polyether glycol, 25 to 30 parts Hylene organic diisocyanate, 2 to 3 parts water, 0.5 to one part wetting agent (such as silicone SF–96 made by General Electric Co.), and one part catalyst, such as mortholine.

The terms "foam rubber-like materials" or "foam-like rubber material" as used in this specification and accompanying claims means these foam materials, as well as all others having the desired characteristics.

The ingredients from which bodies 16, 18 and 19 are formed may be mixed and applied to suitable bottomless molds while the sheet 14 rests on a conveyor belt or the like that gives it the arcuate configuration indicated in FIGURE 3, similar to the manner described in my application Serial No. 672,507, filed July 17, 1957, now Patent No. 2,991,134, granted July 4, 1961. The resulting chemical reaction foams the plastic material in place on the capillary sheet 14 with the result that after the plastic material cures, it is firmly bonded to the inner surface of sheet 14 as well as to the portions of strands 38 that go through to said undersurface. In accordance with my invention, the bodies 16, 18 and 19 are given the shapes diagrammatically illustrated in FIGURES 3 and 10 to define the oil dam 26 and insure that the center lobe 25 is held in position under the journal.

Alternately, and in accordance with the preferred method of making the lubricator, the bodies 16, 18 and 19 are foamed in place, after capillary sheets 14 and 24 have been secured together in the manner indicated in FIGURES 4 and 5. The preferred method of making the lubricator is fully outlined hereinafter.

The body 20 that forms the soft upper portion of lobe 25 in accordance with this invention is made from a material that will make it relatively soft and pliable as compared to the body 16. In the illustrated embodiment of the invention, body 20 is formed from neoprene latex foam, which may be made in sheet form in any suitable manner and cut to size to form the body 20. Body 20 is also provided with an oil resistant and impermeable coating 80 along its sides 82, its ends 84, its bottom surface 86, and is formed with circularly rounded or arcuate top portion 87 that contributes to the formation of the rounded or oval shape of applicator surface 62. Body 20 may also be foamed in place on the undersurface 70 of sheet 24, just under applicator surface 62 by employing an appropriate mold to define the shape illustrated.

An appropriate recipe for a suitable neoprene latex foam would be 100 parts of a suitable latex, such as Type 60 latex made by Du Pont, 3 to 7½ parts petrolatum, 7½ parts zinc oxide, 2 parts of a suitable antioxidant, 2 parts sulfur, 2 parts Dibenzo GMF, 1 part Tepidone plus one part water, 1 part catechol, 0.1 part of a suitable foam stabilizer, and 2 parts sodium silicofluoride. Dibenzo GMF is pp' dibenzoylquinonedioxime made by Naugatuck Chemical Company, of Naugatuck, Conn., while Tepidone is a 60% water solution of sodium dibutyl-dithiocarbamate. The steps employed to process the foam material may follow conventional procedures.

The terms "relatively stiff" and "relatively soft" as employed in the specification and claims may be conveniently defined with reference to the A.S.T.M. standard deflection test for latex foam rubbers (see A.S.T.M. Standards 1958, part 9, page 1707, A.S.T.M. Designation D–1055–58at). This test consists of measuring the load necessary to produce a 25% identation in a foam specimen 12 inches long, 12 inches wide and ¾ inch thick, using an identor foot 50 square inches in area. The results are the force in pounds necessary to indent the specimen the amount specified with the 50 square inch indentor foot.

In accordance with my invention, in the embodiment of FIGURES 1–4, the body 20 should be formed from foam material requiring a force in the range of from 20–40 pounds under the test conditions specified above, while foam bodies 16, 18 and 19 should require a force at least in the range of from 40–80 pounds under the same test conditions. Thus, bodies 16, 18 and 19 should be at least about twice as firm as body 20. Bodies 16, 18 and 19, and body 20 are thus relatively stiff and relatively soft within the meaning defined by test results conducted as specified above.

Before capillary sheet 24 is secured to sheet 14, strap 22 is applied about body 20 along the central portion of sheet 24. Strap 22 may be in the form of a length of cotton tape 88 having its ends 90 doubled over and secured to the forward and rearward edges 52 of capillary sheet 24 by appropriate stitching 92 (see FIGURES 2 and 4).

A further important feature of my invention is that resilient body 16 of the embodiment of FIGURES 1–4 employs helical springs 94 to supplement the resilience of the material forming the body 16. The springs 94 are placed in alignment with the strap 22 and their upper ends bear against the strap 22. In the form illustrated in FIGURES 1–4, three helical springs 94 are employed and may be applied to core 16 by coring out body 16 sufficiently to receive the springs after body 16 has been foamed in place on sheet 14. Alternately, and preferably, the body 16 is foamed in place about springs 94. In such a case, springs 94 preferably are coated with the same material from which body 16 is formed to obtain proper adherence between the foam material and the springs. For instance, if body 16 is foamed from a polyether foam, the springs should be coated with a polyurethane substance.

As indicated in FIGURE 4, the upper ends of the springs are turned downwardly as at 96 to avoid piercing the strap 22 and the soft body 20; the lower ends are upturned as at 97 to avoid piercing the lower blanket.

The oil dam

The oil dam 26 is best shown in FIGURES 3, 13 and 14, and is, in the illustrated embodiments, formed by employing suitable forming mold structures at the rear end of the lubricator as when the body 16 is formed. It will be noted that the oil dam 26 is composed of a wedge-like wall 120 having integrally united therewith an upwardly extending extension 122 which is joined to the wedge-like wall 120 and the upper portion of body 16 by a web 124. The wedge-like wall 120, the extension 122, and the web 124 are preferably formed from the same material as body 16 and are thus integrally united with each other and it. The rear face 126 of wall 120 and extension 122 is provided with a lubricant impermeable coating 128 to insure the oil flow obstructing function of the oil dam 26. The function of oil dam 26 is to catch oil issuing from bodies 16 and 20 and the upper capillary sheet 24 when the lubricator is compressed by the journal. Preferably, the dam is proportioned so that its top 127 is positioned about half way between the top 125a of the journal box rear wall 125 and the maximum diameter 123 of the journal rear fillet 121 (see FIGURE 14) or from ½ to ⅝ inch above the rear wall (at its lowest point) in standard journal boxes.

In accordance with my invention, body 16 is formed adjacent the oil dam to absorb oil collecting in the recesses 129 defined by the oil dam. In the illustrated embodiments, this is done by removing the skin from face 131 of body 16 that is formed by the foaming in place process to expose the porous interior of body 16. Since the interior of body 16 is made up of a multitude of interconnected open cells, indicated at 133 in FIGURE 13, oil collecting in recesses 129 rapidly passes into the body 16.

When body 16 and dam 26 are formed on sheet 14 independently of sheet 24, the edges 130 of the dam should be fixed to the sheet 24 by a suitable adhesive.

Modified forms of invention

The embodiment 111 of FIGURE 4A is substantially the same as lubricator 12 of FIGURES 1–4 except that a neoprene foam body 20a having the deflection characteristics of body 20, replaces bodies 16 and 20, strap 22, and springs 94. Body 20a should be formed from a material having a maximum compression set so that its own resiliency keeps it pressed against the journal with the pressure specified by A.A.R. regulations. Springs corresponding to springs 94 may be employed in body 20a to achieve the required maximum pressure where necessary.

The embodiment 200 of FIGURES 15 and 16 includes a center lobe structure 25b and side lobe structures 27b and 29b, all conforming in general shape to the corresponding shapes of lobes 25, 27 and 29 in the embodiment of FIGURES 1–4. However, the shape of the center lobe structure 25b is maintained by an improved core structure 202, which is received within the central pocket 110b defined by blankets or sheets 14 and 24.

The core structure 202 includes an upper neoprene foam body 20b and a lower neoprene foam body 16b, which have the deflection characteristics of body 20 and which are disposed on either side of a polyurethane foam sheet or layer 204 having the deflection characteristics of body 16. Sheet or layer 204 has embedded therein at spaced intervals a plurality of elongate coil springs 206, which may be of the well-known door spring type.

The polyurethane foam or sheet 24 and the neoprene foam bodies 16b and 20b may be formed from the respective foam materials already specified and springs 206 are preferably applied to sheet or layer 204 by having the polyurethane foam material foamed in place about them; in such case, springs 206 are preferably coated as described above in connection with springs 94 to obtain proper adherence between the foam material and the springs.

The bodies 16b, 20b and sheet or layer 204 when initially formed have the shapes and proportioning indicated in FIGURE 17, wherein they are shown received in a suitable mold 208 that is employed during the course of manufacture of core structure 202. When core structure 202 is released from mold 208, bodies 16b and 20b adhere to sheet or layer 204. The core structure 202 automatically assumes the shape shown in FIGURE 15 when the ends 205 of layer 204 are turned into substantial parallelism for insertion of the core structure 202 in pocket 110b. Springs 206 insure that the applicator surface 62 of the embodiment of FIGURE 15 is provided with the desired oval or rounded configuration illustrated due to their known tendency to assume an arcuate shape when the ends of the spring are placed in substantial parallelism. Furthermore, the bracing action provided by the spring ends 210 insures that the center lobe will engage the journal with the required minimum pressures.

Preferably, lubricator 200 includes an oil dam 26b, which is similar in nature to oil dam 26 of FIGURES 1–4. However, in the embodiment of FIGURE 15, the oil dam is formed after core structure 202 has been applied to pocket 110b, as by having polyurethane foam body 212 foamed in place in the open rear end of the center lobe 25b. This may be done in any suitable manner, as by mounting lubricator 200 in an appropriate fitting or holder device and pouring the foam material into an appropriate mold placed at the rear end of the lubricator.

Of course, the rear wall of neoprene foam body 16b should be formed to insure that oil collected by the oil dam has ready access into the interior of body 16b.

In a preferred manner of making the embodiment of FIGURE 15, and in particular the core structure 202, the neoprene bodies 16b and 20b are cut to the desired shape from foam sheeting, while the polyurethane foam of sheet or layer 204 is foamed in place against and between the adjacent surfaces of bodies 16b and 20b. This insures that the open pockets of all these foam bodies are in communication with each other.

Preferably, an open mesh fabric or netting 209 is applied between sheet or layer 204 and body 20b to act as a guard against the springs 206 working out of the foam material.

In the embodiment 220 of FIGURE 18, the side lobes 27c and 29c are arranged substantially as described above, they being defined by lower and upper blankets or sheets 14c and 24c that are made substantially the same as sheets 14 and 24, except that sheet 24c is piled between points 222 and 224, sheet 24c does not envelop the center lobe core structure, and the side lobe bodies 18c and 19c are given the shapes indicated, as by foaming them in place in a device holding the blankets in the shape illustrated. This provides an arcuate recess 226 that receives center lobe structure 25c, which is composed of a cylindrical foam body 228 having looped thereabout a blanket 230, which is made in a manner similar to blanket 24 and is formed with applicator surface 62 having the multi-level pile arrangement previously described, though with the high lift strands forming loops 58c and 60c form no loops below points 222 and 224; of course, said high lift strands extend the length of blanket 230 (and, of course, transversely of the lubricator). Body 228 may be made from neoprene foam having deflection characteristics similar to body 20 and preferably has foamed in place therein, at spaced intervals along its axis (similar to the spring spacing of FIGURE 16) and disposed concentrically thereabout in substantially the same radial spacing, a plurality of coil springs 232. Blanket 230 may be quadrilateral in configuration and have its ends secured together as by stitching 234. Blanket 230 is also preferably secured to blankets 14c and 24 along the central axis of the lubricator as by stitching 236.

*Assembly and operation of lubricator*

The preferred manner of assembling the lubricator 12 of FIGURES 1–4 is to make the capillary sheets 14 and 24 as described above, and before bodies 16, 18 and 19 are formed, and after body 20 and strap 22 have been secured to sheet 24, stitching the sheets 14 and 24 together along their edges 100 as by stitching 102 along common stitch lines 103, and at spaced points intermediate the desired locations of the respective bodies 16, 18 and 19 as at spaced tack stitchings 104 (see FIGURE 5) along common stitch lines 105. Springs 94 may then be applied between strap 22 and the lower capillary sheet with the spacing indicated in FIGURES 2 and 3. The thus formed sub-assembly is then placed in a suitable holder or mold structure which holds the sub-assembly so that the blankets or sheets 14 define pockets 110, 112 and 114, respectively, that have the shape best shown in FIGURES 4 and 10. The foam material is then mixed and poured into the respective pockets to foam in place the bodies 16, 18 and 19 on both or with respect to both the upper and lower capillary sheets 14 and 24, and with regard to body 16, the body 20, strap 22, and springs 94. Suitable plugs or the like are preferably inserted in the ends of pockets 110, 112 and 114 so that the ends of the thus formed bodies 16, 18 and 19 will be spaced inwardly from the front and rear edges of the lubricator. Of course, the mold structure, or the end plug for the rear end of pocket 110, should be formed to define the oil dam 26.

The embodiment 111 shown in FIGURE 4a may be made in generally the same way as lubricator 12 except that neoprene foam conforming to the deflection test above specified is foamed in place in pocket 110a in a sub-assembly composed of capillary sheets 14 and 24, secured together as described above, which is placed in a suitable holder or mold to define pockets 110a, 112a and 114a.

In the embodiment of FIGURE 15, the blankets or sheets 14 and 24 are assembled as described above and the side lobe core bodies 18 and 19 are formed as also described above.

The core structure 202 for the center lobe is formed by cutting blocks of neoprene foam having the characteristics aforementioned to the shapes indicated for bodies 16b and 20b, respectively, and then placing them in the mold sections of mold 208 for positioning on either side of a row of springs 206 which are held at their ends in any suitable manner as by engaging in suitable recesses formed in lower mold section 217; in the showing of FIGURE 17, the foam block 214 forming body 16b rests on a bottom cavity 216 of lower mold section 217, while block 218 that forms body 20b is supported in any suitable manner in a top cavity of upper mold section 219.

Before closing the mold, the polyurethane material is poured over and about springs 206, after which the netting 209 is put on top of the polyurethane material. The mold is then closed to assume the position shown in FIGURE 17 and bring block 218 into contact with the foam material then forming layer 204.

After the foaming process of the polyurethane material has been completed, the new core structure 202 is removed from the mold for application to a lubricator 200 in the manner already described. Of course, the ends of springs 206 projecting out of layer 204 are trimmed off before the core structure is applied to a lubricator, and suitable reinforcements may be applied to the undersurface of blanket 146, along the rows of spring legs 210, to protect the blanket from wear.

In the embodiment of FIGURE 18, the subassembly 240 defined by blankets 14c, 24c and 230 may be placed in a suitable holder and pocket definer so that foam bodies 18c, 19c and 228 may be foamed in place. Lubricator 220 also includes an oil dam 26c similar to dam 26 and defined by suitable mold structures when body 228 is foamed in place. Body 228 may be solid through the cross section of the center lobe 25c, but with springs 232, may be hollow as at 242, thus reducing the amount of foam material required to form same.

In use, the completed packings herein described may be compressed and inserted under the journal 11 without jacking the box. The operative position of the respective packings is indicated by the showing of FIGURES 1 and 2 wherein it will be noted that the applicator surface 62, formed by the alternating high and low loops of capillary sheet 24, is in contact with the journal, but the remainder of the sheet is spaced from the journal.

The drawing figures indicate that the packings illustrated define themselves into the three lobe shape previously mentioned, including, for instance, the relatively large center lobe 25, and relatively small side lobes 27 and 29 that in the embodiment of FIGURES 1–4 are in effect hinged to the large lobe 25 about axes defined by the spaced stitchings 104. The lobes 25, 27 and 29 are proportioned to extend longitudinally of the journal when the packing 12 is applied to the journal in the manner indicated in FIGURES 1 and 2 and side lobes 27 and 29 are spaced from the journal.

In the embodiments of FIGURES 1–17, the lobe structures define recesses 144 into which the strands 56 and 56a of the top capillary sheet 24 extend to form substantially vertical wicks leading directly to applicator surface 62. As shown in FIGURES 10 and 15, the center lobe has a generally transverse cross-sectional configuration defining generally upright side walls 146; the side lobes are of generally sector shape transverse cross-sectional configuration defining side wall structures 148 and top wall structures 150.

Similar remarks apply to the embodiment of FIGURE 18 except that the high lift strands of blanket 230 follow its natural curve. Side lobes 27c and 29c are hinged to center lobe at stitching 236.

I have found that it is undesirable to have the lubricating surface 62, or any other applicator surface, in contact with, or wrapped around the journal vertically upwardly along the sides of the journal more than the extent indicated in the drawings. By keeping the applicator surface contact confined as closely as possible to the underside of the journal, a lower capillary lift path is provided which permits a greater quantity of oil to be lifted to the journal. If the surface 62 should extend up the sides of the journal a substantial distance, the wicking material at the highest elevation would receive so little lubricant from the capillary feed paths that it would wipe oil from the journal rather than transfer oil to the journal.

I therefore provide the center lobe of the embodiments herein disclosed with the circularly rounded shape indicated (in transverse section) in the unstressed condition, to keep the center lobe from wrapping around the sides of the journal to any great extent when in operating position. This also minimizes the tendency of the top side edges of the center lobe to bulge into the space between the journal and the side lobes when in operating position.

There are several other important proportioning relationships that must be taken into consideration in the forming of the bodies and capillary sheets of the invention. Since my invention contemplates that the side lobes provide a holding action on the center lobe, the lobes must be proportioned so that when the lubricator is inserted under the journal, the side lobes will be swung by the box floor about the axes defined by, for instance, stitching 104 of FIGURE 5 (or stitching 236 of FIGURE 18), into engagement with the sides of the center lobe. Furthermore, to obtain a maximum stability in the embodiments of FIGURES 1–17, the center lobe should be proportioned so that its width dimension X of FIGURE 11 is substantially equal to or slightly greater than its height in its free and uncompressed state. If the height of the center lobe, for instance, center lobe 25, were substantially greater than its width, there would be a tendency for the center lobe to tilt or bend excessively, which would cause a greater proportion of the applicator surface 62 to extend up one side of the journal, with the adverse effect already mentioned.

For a conventional 5½ inch by 10 inch journal box, which provides a nominal 3 inch working dimension between the floor of the box and the undersurface of the journal, the dimension X should be in the 3 to 4 inch range and the side lobes should be proportioned to maintain approximately a ½ inch clearance between the side lobes and the journal. A lubricator made for a 5½ inch by 10 inch box, should contact between 30 and 40 square inches of journal surface, but in any event, the contact made by any size lubricator should not be more than the lower one-fourth of the journal surface, and preferably the contact area is as much less than that amount which will still permit adequate oil application to the journal.

Moreover, A.A.R. specifications require that the total contact pressure against the journal should be sufficient to support a five pound weight at a height of 3⅜ inches for a 5½ inch by 10 inch box. Under these circumstances, the height of the center lobe would be 3⅜ inches, since the bodies 16 and 20, or 20a provide the supporting action required.

Dimensions for journal boxes of other sizes would be in substantially the same proportions as for the 5½ inch by 10 inch box.

When the lubricator, for instance, lubricator 12 is applied to the box 10, the center lobe 25 is compressed to work it under the journal 11. As the packing is worked under the journal 11, and the lower capillary sheet 14 is worked into full contact with the journal box floor 145, the side wall structures 148 of the side lobes 27 and 29 are brought into firm engagement with the respective side walls 146 of the center lobe 25 and the upper edges of the center lobe deflect outwardly somewhat into the space between the side lobes and the journal, rather than rolling further up the sides of the journal (note the two position showing of FIGURE 11). The comparative stiffness of the side lobes 27 and 29, as determined by the bodies 18 and 19, effects a secure holding action on the center lobe 25 against the rotating action of the journal (see FIGURE 12), without a change in shape of the side lobes. Since the upper portion of the center lobe 25, as defined by the relatively soft body 20 and the portion of the capillary sheet 124 overlying same, is relatively soft, the rotating action of the journal will deform the center lobe somewhat as indicated in FIGURE 12, but the holding action of the relatively stiff side lobes is effective to hold the center lobe under the journal. Furthermore, the trailing edge of the surface 62 does not rise appreciably up its side of the journal.

The important relationships between the box floor, the center lobe and the side lobes involved in this invention are diagrammatically brought out in FIGURES 11 and 12 which also indicate the manner in which the center lobe is deformed by the journal. FIGURE 11 illustrates the condition when the journal is stationary, as distinguished from the rotating journal of FIGURE 12. Arrows 147 indicate the forces acting on the side lobes by virtue of the lubricator being pressed against the box floor, and arrows 149 indicate the compressing forces applied to the center lobe 25 by side lobes 27 and 29 under the action of the forces indicated by arrows 147.

The foregoing remarks also apply to the lubricators 111, 200 and 220 of FIGURES 4a, 15–17, and 18, respectively.

*Advantages of invention*

It will, therefore, be seen that I have provided a three lobe lubricator in which the center lobe is relatively large and is composed of, in the embodiment of FIGURES 1–4, an upper relatively soft portion and a lower relatively firm portion, while the side lobes are relatively firm and do not contact the journal but serve to support the center lobe in maintaining its operative position. The foam body 16 and springs 94 of the center lobe provide the strength required to maintain the center lobe in contact with the journal makes during its operation while the soft upper portion presses against the journal with a minimum force. Since the side lobes do not contact the journal, the applicator surface 62 contacts only the lower portion of the journal, and the pressure of the lubricator against the journal is minimized by the relatively soft upper portion of the center lobe, journal friction is substantially reduced and I have found that the disclosed lubricators avoid the excessive heat generating characteristics inherent in most conventional journal box packings.

Similar remarks apply to the embodiments of FIGURES 4a, 15–17 and 18.

When the packings illustrated are received in the box, capillary feed is through the recesses 148 by virtue of the high lift strands 56 and 56a extending from the lower reaches thereof to the pile applicator surface 62. Furthermore, when oil is supplied to the box, it immediately flows through recesses 148 from one end of the box to the other, which makes for rapid absorption of the oil by the lubricator. Even though recesses 148 might appear to be substantially closed by the supporting action of the side lobes against the center lobe, the capillary feed through strands 56 and 56a is uneffected since feed is through small spaces between the fibers of these strands, and pile loops 58 of the walls of the side lobes abutting the center lobe walls, insure adequate spacing between the center and side lobes to provide the necessary oil flow channels between the front and rear ends of the lubricator.

During operation of the journal, oil that drips or is thrown off the journal is caught by the upwardly inclined top wall structures 150 of the side lobes which return the oil to recesses 148 and the portions of the high lift strands 56 and 56a forming the capillary feed paths on either sides of applicator surface 62. When the journal rotates during operation of the railroad car, the relatively soft upper portion of the center lobe deflects somewhat as indicated in FIGURE 12, which means that the capillary feed to the portion of the journal surface rotating toward the center lobe approaches vertical alignment with the center line of the journal, while the capillary feed to the outwardly moving surface of the journal is almost directly to the point where the journal surface leaves applicator surface 62. This direct oil feed arrangement plus the low elevations (with regard to the oil reservoir) of side edges of surface 62, insures the application of a maximum oil film to the journal, which is not wiped off or absorbed by the side lobe structures (which are ordinarily drier than the center lobe structure) since they are spaced from the journal in accordance with my invention. Furthermore, the positioning of the side edges of applicator surface 62 as close to the low point of the journal undersurface as possible insures that oil is transferred to the journal at the edges of surface 62 as well as at its center portion.

The oil dam 26 functions to obstruct oil flow from the lubricator through the rear of the box, especially when it is rounding an inside curve and serves to return it to the lubricator through the porous wall 131 of the center lobe. Since the foam bodies 16, 20a and 238 are in intimate contact with the capillary sheeting along center lobe side walls 146, and thus with strands 56 and 56a, this oil is channelled directly back to the pile forming strands from the oil dam (in the embodiment of FIGURE 15, the oil passes through the interconnected open cells of bodies 16b and 204). The foaming of the material forming, for instance, the bodies 18 and 19 within molds provides a skin-like structure at the ends of these bodies which tends to obstruct oil flow from the foam bodies; since these bodies are disposed to either side of lower portion of box rear wall 125, oil leaking through the rear ends of these bodies does not tend to flow out of the rear of the box so oil dams equivalent to dam 26 are not required for the side lobes.

The application of the adhesive 80 about the sides and bottom of soft body 20 of FIGURES 1–4 forms this body into a reservoir for oil, since oil is trapped by the adhesive 80 at the bottom of this body. This provides an oil saturated structure immediately under the journal, in addition to the oil feed provided by high lift strands 56, which is in direct contact with the bases of the pile loops forming applicator surface 62.

The piled surface 36 formed by the loops of lower capillary sheet 14 serves to increase the friction between the lubricator and the floor of the box. These loops also form baffles for the oil in the box in that the loops tend to keep the oil from sloshing around under the lubricator during operation of the railroad car. This further reduces loss of lubricant out of the rear of the box.

Coating 42 of lower sheet 14 will inhibit oil drainage from the bottom and side of the lubricator.

Where the lubricator contains, for instance, body 16 having springs 94 foamed in place within the body, the close and intimate contact between the spring and the foam insures that spring flexion will not cause wear on the foam, as there is no rubbing between the metal and the foam.

The tendency of the oval or arcuate top portion of the center lobe to minimize outward bulging of the side edges thereof, when the lubricator is applied to a box, in turn minimizes any consequent increase in feed path length to the journal and pinching of the capillary fibers that may occur due to the deformation of the center lobe by the journal. This shaping and proportioning of the center lobe also eliminates any tendency of walls 146 to buckle at points below their upper edges, which would also increase the capillary feed path length and cause pinching of the capillary fibers.

The foam materials suggested for making the foam bodies hereindescribed are given merely by way of example as any suitable foam materials may be employed so long as the presure and stiffness relationships herein described are observed.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a lubricator for a railroad car journal box of the type in which the floor of the box serves as an oil reservoir and oil is lifted by the lubricator to the undersurface of a car axle journal that extends into the box, said lubricator comprising spaced parallel resilient lobes secured together and proportioned to extend longitudinally of the box when inserted therein between the undersurface of the journal and the box floor, said lobes including a central lobe and spaced side lobes on either side of said central lobe, said central lobe being proportioned to contact the journal when the lubricator is applied between the journal and the box floor and having an upper soft journal contacting portion including an applicator surface defined by capillary means for lifting oil from the oil reservoir when the lubricator is in operative position in the box, said applicator surface defining side edges along either side of said central lobe and extending generally parallel to said central lobe, said side lobes being proportioned to be spaced from the journal when the lubricator is applied between the journal and the box floor, said side lobes being relatively stiff as compared to said central lobe journal contacting portion, said side lobes being respectively hinged to said central lobe below said central lobe side edges, respectively, for swinging movement about axes that extend longitudinally of said central lobe, said side lobes being formed to abut against the sides of said central lobe when the lubricator is applied between the journal and the box floor, whereby said side lobes serve to support said central lobe against the drag applied thereto by the rotating action of the journal during operation thereof when the lubricator is in operative position in the box.

2. In a lubricator for a railroad car journal box of the type in which the floor of the box serves as an oil reservoir and oil is lifted by the lubricator to the undersurface of a car axle journal that extends into the box, said lubricator comprising a multilobe body including a relatively large center lobe, and a relatively small side lobe on either side of said center lobe, said body being proportioned to extend longitudinally of the journal when applied to the box between the journal undersurface and the box floor, said center lobe being proportioned to extend between the box floor and the journal and be compressed when the lubricator is so applied to the box and including capillary means for lifting oil from the oil reservoir to the journal when the lubricator is in operative position in the box, said small lobes being proportioned to be spaced from the journal when the lubricator is applied to the box, said lobes being resiliently flexible, said center lobe having a soft upper portion of convexly rounded transverse cross section in its unstressed condition and said side lobes being at least twice as stiff as said upper portion of said center lobe, said side lobes being formed to abut against the sides of said center lobe when the lubricator is applied to the box between the undersurface of the journal and the floor of the box, whereby said side lobes serve as side supports for said center lobe to maintain the upper portion thereof in contact with the undersurface of the journal when the lubricator is in operative position in the box.

3. In a lubricator for a railroad car journal box of the type in which the floor of the box serves as an oil reservoir and oil is lifted by the lubricator to the undersurface of a car axle journal that extends into the box, said lubricator comprising a relatively large resilient center lobe and a relatively small resilient side lobe secured thereto on either side thereof, said lobes being proportioned to extend longitudinally of the box when inserted between the journal and the box floor, said center lobe having a convexly rounded upper surface in its unstressed condition, and including upwardly directed side walls, said side lobes being hingedly connected to said center lobe adjacent the juncture of said center lobe side walls and the bottom thereof, said side lobes each being formed with an upwardly directed wall structure that is positioned adjacent the respective center lobe side walls, said center lobe being relatively soft and pliable at its upper portion, capillary means forming the top of said center lobe for supplying oil to the journal when the lubricator is inserted between the journal and the box floor, said side lobes being relatively stiff as compared to said center lobe, said side lobe wall structures respectively engaging said side walls of said center lobe when said lubricator is applied to the box to hold said center lobe against the drag of the journal on operation of the latter.

4. In a lubricator for a railroad car journal box of the type in which the floor of the box serves as an oil reservoir and oil is lifted by the lubricator to the undersurface of a car axle journal that extends into the box, said lubricator comprising a relatively large resilient center lobe and a relatively small resilient side lobe on either side of said center lobe, said lobes being proportioned to extend longitudinally of the box when inserted between the journal and the box floor, said center lobe being proportioned to extend between the box floor and the journal and be compressed when the lubricator is inserted between the journal and the box floor, said side lobes being proportioned to be spaced from the journal when the lubricator is inserted between the journal and the box floor, said center lobe comprising an upper soft and pliant resilient body, a lower resilient body that is relatively stiff, as compared to said soft body, and a capillary blanket overlying said soft body and including capillary strands adapted to extend into the reservoir when the lubricator is inserted between the journal and the box floor for lifting oil to the journal, said side lobes comprising resilient bodies that are relatively stiff as compared to said center lobe soft body, said center lobe being formed to define upright side walls and said side lobes being formed to define side wall structures that abut the respective center lobe side walls when the lubricator is inserted between the journal and the box floor, said side lobes being hingedly connected to said center lobe adjacent the lower portion thereof, whereby said side lobe wall structures engage said side walls of said center lobe respectively, when said lubricator is applied to the box, to hold said center lobe against the drag of the journal on operation of the latter.

5. In a lubricator for a railroad car journal box of the type in which the floor of the box serves as an oil reservoir and oil is lifted by the lubricator to the undersurface of a car axle journal that extends into the box, said lubricator comprising upper and lower sheets of capillary material defining a center pocket and a side pocket on either side of said center pocket, a lower stiff resilient body and an upper relatively resilient body that is relatively soft as compared to said stiff body received in said center pocket, a resilient body received in each of said side pockets, said bodies of said side pockets being relatively stiff as compared to said soft body, said center pocket and the bodies received therein being proportioned to define a center lobe structure that extends between the box floor and the journal and is compressed when the lubricator is inserted between the box floor and the journal, said side pockets and the bodies respectively received therein being proportioned to define side lobe structures that are spaced from the journal when the lubricator is inserted between the box floor and the journal, said lower sheet of capillary material having a configuration that is generally complementary to the floor of the box in which the lubricator is to be inserted and said sheets being secured together in the recesses between said pockets to form a pivotal connection between said center and side lobe structures, the portion of said upper sheet of capillary material overlying the bodies of said center lobe structure having a piled applicator surface formed by continuous capillary strands that are oriented to extend transversely of the journal when the lubricator is inserted in the box, and that extend downwardly from said surface and into said recesses between said pockets, said recesses forming spaced channels for receiving oil when the lubricator is inserted between the journal and the box floor, said side lobe structures each defining a side wall structure proportioned to engage the adjacent side wall of the center lobe structure when the lubricator is received between the box floor and the journal so as to pivot said side lobe structure about said pivotal connection and toward and into engagement with said center lobe structure.

6. The lubricator set forth in claim 5 wherein said lower body of said center lobe structure carries helical spring means, and wherein a sheet of wear resisting material is interposed between said spring means and said upper body of said center lobe structure.

7. The lubricator set forth in claim 5 wherein the outer surface of said lower sheet of capillary material is formed with a pile that is coextensive with said lower sheet.

8. The lubricator set forth in claim 5 wherein said side lobe structures each define an upper wall structure that inclines downwardly from the sides of the lubricator to said side wall structures of said side lobe structures when said lubricator is inserted between the box floor and the journal, said upper wall structures serving to catch oil drippage from the journal during operation thereof, when the lubricator is in operative position in the box, and return same to said recesses for reapplication to the journal.

9. The lubricator set forth in claim 5 wherein said relatively soft body of said center lobe structure comprises foam rubber-like material having its sides and bottom coated with a layer of oil resisting material.

10. The lubricator set forth in claim 5, wherein said relatively soft body of said center lobe structure is secured to said upper sheet of capillary material by a flexible strap, said strap extending longitudinally of the lubricator between said upper and lower bodies of said center lobe structure, and having its ends secured to the front and rear edges of said upper sheet.

11. The lubricator set forth in claim 5 wherein said lower body of said center lobe structure carries spaced helical springs extending generally perpendicular to the plane of said lower body, said springs being coated with a material to which the material forming said lower body adheres, said lower body comprising foam rubber-like material foamed in place in said center pocket on said lower capillary sheet and about said springs.

12. The lubricator set forth in claim 5 wherein said bodies and center pocket of said center lobe structure provide said center lobe structure in its uncompressed condition with a circularly rounded configuration in transverse cross-section, whereby said center lobe structure at its upper portion is so proportioned that when the lubricator is inserted between the journal and the floor of the box, said applicator surface of said center lobe structure contacts no more than the lower one-quarter of the journal.

13. In a lubricator for a railroad car journal box of the type in which the floor of the box serves as an oil reservoir and oil is lifted by the lubricator to the undersurface of a car axle journal that extends into the box, said lubricator comprising spaced parallel resilient lobes secured together and proportioned to extend longitudinally of the box when inserted therein between the undersurface of the journal and the box floor, said lobes including a center lobe having a convexly rounded upper surface in transverse cross section, and spaced side lobes on either side of said center lobe and hinged thereto adjacent the bottom portions of said side lobes, respectively, said center lobe being proportioned to contact the journal when the lubricator is applied between the journal and the box floor and having an upper relatively soft journal contacting portion including capillary means for lifting oil from the oil reservoir when the lubricator is in operative position in the box, said side lobes being proportioned to be spaced from the journal when the lubricator is applied between the journal and the box floor, said side lobes being relatively stiff as compared to said center lobe journal contacting portion, said side lobes and said center lobe being formed with opposing side wall structures that engage when the lubricator is applied between the journal and the box floor, whereby said side lobes serve to support said center lobe against the drag applied thereto by the rotating action of the journal during operation thereof when the lubricator is in operative position in the box.

14. The lubricator set forth in claim 13 wherein said center lobe includes a piled applicator surface defined by said journal contacting portion thereof and a core structure for biasing said applicator surface against the journal when the lubricator is inserted in the box, said core structure comprising a lower relatively stiff resilient body and an upper relatively soft resilient body defining the rounded configuration of said journal contacting portion of the center lobe.

15. The lubricator set forth in claim 13 wherein said center lobe includes a piled applicator surface defined by said journal contacting portion thereof and a core structure for biasing said applicator surface against the journal when the lubricator is inserted in the box, said core structure comprising a lower relatively stiff sheet of foam rubber-like material formed into an inverted U-shaped configuration and having elongate spring means embedded therein and extending transversely thereof, and an upper relatively soft resilient body defining the rounded configuration of said journal contacting portion of the center lobe.

16. The lubricator set forth in claim 13 wherein said center lobe includes a pile applicator surface defined by said journal contacting portion thereof and a core structure for biasing said applicator surface against the journal when the lubricator is inserted in the box, said core structure comprising a cylindrical relatively soft body of foam rubber-like material extending longitudinally of the center lobe and defining the rounded configuration of said journal contacting portion of the center lobe, said soft body having circular spring means embedded therein, said applicator surface being formed by a fabric blanket encircling said soft body.

17. In a lubricator for a railroad car journal box of the type in which the floor of the box serves as an oil reservoir and oil is lifted by the lubricator to the undersurface of a car axle journal that extends into the box, said lubricator comprising a relatively large resilient center lobe and a relatively small resilient side lobe secured thereto on either side thereof, said lobes being proportioned to extend longitudinally of the box when inserted between the journal and the box floor, said center lobe having a convexly rounded upper surface in its unstressed condition, and including upwardly directed side walls, said side lobes being hingedly connected to said center lobe below the side margins of said center lobe upper surface thereof, said side lobes each being formed with an upwardly directed wall structure that is positioned adjacent the respective center lobe side walls, said center lobe being relatively soft and pliable at its upper portion, capillary means forming the top of said center lobe for supplying oil to the journal when the lubricator is inserted between the journal and the box floor, said side lobes being relatively stiff as compared so said center lobe, said side lobe wall structures respectively engaging said side walls of said center lobe when said lubricator is applied to the box to hold said center lobe against the drag of the journal on operation of the latter.

18. In a lubricator for a railroad car journal box of the type in which the floor of the box serves as an oil reservoir and oil is lifted by the lubricator to the undersurface of a car axle journal that extends into the box, said lubricator comprising a body of foam rubber like material proportioned to extend longitudinally of the box when the lubricator is inserted therein between the undersurface of the journal and the box floor, capillary blanket means defining an open ended pocket in which said body is received, said blanket means being biased against the journal when the lubricator is applied between the journal and the box floor, the rear edge of said blanket means overlapping the end of said body that is to be positioned adjacent to the rear end of the box when the lubricator is applied thereto, and an oil retaining dam closing off a substantial portion of the opening defined by said rear edge of said blanket means about the said end of said body, said dam comprising an oil impervious wall extending upwardly from the bottom of the pocket and transversely of said body, said wall being of sufficient height to extend above the level of the box rear wall at the center of the box when the lubricator is applied between the journal and the floor of the box, said foam rubber like material being foamed in place on said blanket means to directly adhere to said blanket means, said end of said body formed by said foam rubber like material and said dam defining an oil receiving recess at the rear end of the lubricator, said rear end of said body being formed to place said recess in direct communication with the porous interior of said body, whereby oil collecting in said recess during operation of the journal when the lubricator is applied thereto is returned through said body to said capillary blanket means.

References Cited in the file of this patent
UNITED STATES PATENTS

| | | |
|---|---|---|
| 591,406 | Koch | Oct. 12, 1897 |
| 2,807,803 | Rockwell | Sept. 24, 1957 |
| 2,814,600 | Mitchell | Nov. 26, 1957 |
| 2,919,964 | Evans | Jan. 5, 1960 |

UNITED STATES PATENT OFFICE
CERTIFICATE OF CORRECTION

Patent No. 3,020,103                                February 6, 1962

Robert J. Harkenrider

It is hereby certified that error appears in the above numbered patent requiring correction and that the said Letters Patent should read as corrected below.

Column 14, line 50, after "lower" insert -- relatively -- line 51, strike out "relatively", first occurrence; column 16, line 62, for "so" read -- to --.

Signed and sealed this 10th day of July 1962.

(SEAL)
Attest:

ERNEST W. SWIDER                                      DAVID L. LADD
Attesting Officer                                           Commissioner of Patents